United States Patent Office 2,805,170
Patented Sept. 3, 1957

2,805,170

HEAT STABILIZED COMPOSITIONS CONTAINING ALKOXYPHENYLGLYCIDYL ETHERS

Alan Bell, Kingsport, Tenn., assignor to Eastman Kodak Company, Rochester, N. Y., a corporation of New Jersey No Drawing. Application November 2, 1953, Serial No. 389,839

8 Claims. (Cl. 106—176)

This invention relates to novel stabilizers for thermoplastic compositions and more particularly to compositions comprising cellulose esters and vinyl polymers stabilized as to flow and color by the incorporation therein of relatively small amounts of the compounds of the invention.

The stabilizing effect of various glycidyl ethers of resorcinol and hydroquinone, e. g. hydroquinone bisglycidyl ether and resorcinol bisglycidyl ether has been known and utilized in the art for some time. The possibility of improved stabilizers which are more compatible with the plastic compositions has been investigated for the purpose of improving the character of these compositions.

I have discovered that a certain class of alkoxyphenyl glycidyl ethers is extremely effective in the heat stabilization of these compounds while offering the additional advantage of being more compatible and soluble in the plastic base, particularly as applied to cellulose ester compositions. I have also found that the position of the alkoxy group on the benzene ring is of unuusal significance in the effectiveness of my new class of stabilizers. Whereas it has been determined that the stabilizing effect of glycidyl type compounds may in general be said to be in direct relation to the amount of oxirane oxygen contained in the compound, I have found unexpectedly that the new class of stabilizers is equally as effective as compounds in the prior art containing approximately twice the amount of oxirane oxygen.

It is therefore a principal object of the present invention to provide improved stabilizers for thermoplastic compounds and compositions, e. g. cellulose esters and vinyl polymers. It is a further object of the invention to provide novel and improved heat and color stabilized thermoplastic compositions comprising cellulose esters of vinyl polymers. A further object is to provide novel compounds comprising o- and p-alkoxyphenylglycidyl ethers.

In accordance with my invention cellulose ester and vinyl polymer thermoplastic compositions having improved heat stability as regards flow, color, and melt and intrinsic viscosity are prepared by incorporating a relatively small stabilizing amount of an alkoxyphenylglycidyl ether selected from the group consisting of o- and p-alkoxyphenylglycidyl ethers. Preferably the alkoxy group comprises an unsubstituted acyclic alkyl radical of 1 to 4 carbon atoms inclusive. The stabilized compounds may also contain plasticizers and other stabilizing compounds. The novel stabilizer may be incorporated in the thermoplastic base by intimate dispersion therein in accordance with known procedures.

A most advantageous embodiment of the invention consists in a plastic composition of cellulose acetate or cellulose acetate butyrate containing dibutylsebacate as plasticizer and o- or p-methoxyphenylglycidyl ether, either alone or in combination with additional stabilizer comprising p-tertiary butyl phenol, potassium acid oxalate also preferably being present as a flow stabilizer. The o- and p-alkoxyphenylglycidyl ether stabilizers are preferably employed in an amount within the range of about 0.5% to about 4.0%, most advantageously about 2.0%, of the weight of the plastic compound.

The stabilizers of the invention may be prepared by the reaction of an appropriate alkoxyphenol with epichlorohydrin in alkaline solution. The reaction may be represented by the following equation:

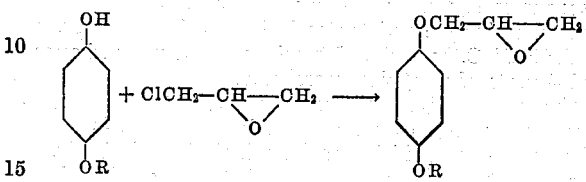

The invention is illustrated in the following examples:

Example 1.—Preparation of 1 - (2,3 - epoxypropoxy) - 4-methoxybenzene 310 parts of hydroquinone monomethyl ether was dissolved in an alkaline solution containing 100 parts of sodium hydroxide in 500 parts of water. The temperature was kept below 20° C. by cooling and an atmosphere of nitrogen was maintained although this was not absolutely necessary. A slightly better colored product may be obtained in cases where nitrogen is used.

The alkaline solution of the hydroquinone monomethyl ether was stirred while 235 parts of epichlorohydrin was added over a 2 hour period without cooling, the internal temperature rising to about 30° C. during the addition of epichlorohydrin. The mixture was then stirred overnight at room temperature. The white solid which had formed was filtered, washed with water and dried. The yield was 400 parts of a product which melted at 36–38° C. This material contained by analysis 7.2 percent epoxy. The crude product was recrystallized from hexane and melted at 39–40° C. The product was then further purified from benzene-hexane to give white crystals, M. P. 43–43.5° C. Analysis calcd. for $C_{10}H_{12}O_3$; C, 66.65; H, 6.71; epoxy, 8.85. Found: C, 66.63; H, 6.89; epoxy 7.62. The epoxy analysis is usually low in compounds of this type.

Example 2.—Preparation of 1 - (2,3 - epoxypropoxy) - 4-butoxybenzene

This product was prepared in a manner similar to the procedure described in Example 1 except that the monobutyl ether of hydroquinone was used. The product was distilled at 142–50° C. (1 mm.) to give a 60% yield of a white crystalline solid, M. P. 34–35° C. (epoxy 7.41%).

Example 3.—Preparation of 1-benzyloxy-4-(2,3-epoxypropoxy) benzene

This material was also prepared by the procedure described in Example 1. The product distilled at 182–88 (0.5 mm.) and melted at 58–60° C. (epoxy content was 6.01%; theory 6.2).

Example 4.—Preparation of 1 - (2,3 - epoxypropoxy) - 2-methoxybenzene

This catechol derivative was prepared by the procedure of Example 1 using guaiacol and epichlorhydrin. It distilled at 87–92 (0.1 mm.) to give a colorless liquid which did not crystallize (analysis for epoxy was 9.0%).

Example 5.—Preparation of 1 - (2,3 - epoxypropoxy) - 3-methoxybenzene

This product was prepared in a similar manner from resorcinol monomethyl ether and epichlorhydrin. It was a colorless liquid, B. P. 140–50° C. (0.6 mm.); epoxy content was 8.16%.

*Example 6.—Stabilization of cellulose ester plastic molding compositions*

Samples of the p-methoxyphenylglycidyl ether (1-[2,3-epoxypropoxy]-4-methoxybenzene) prepared in Example 1 were tested with the results as shown in Table I below. In these tests, a cellulose acetate butyrate composition of about 12–13% acetyl and 36–38% butyryl content, prepared in accordance with the disclosure of U. S. Patent No. 2,048,685 was treated with plasticizer, potassium acid oxalate flow stabilizer and various stabilizers. The tests were run by injection molding of the various compositions and subjecting the pellets punched from these specimens to the 205° C. heat test. In each case, 100 parts of ester and 4 parts of plasticizer were used.

The results of these tests indicate that the 1-(2,3-epoxypropoxy)-4-methoxybenzene is as effective in both flow and color stabilizing as resorcinol bisglycidyl ether. The tests made using p-tert-butylphenol in combination with the other stabilizer indicated that the combinations were essentially equal to each other. These results were unexpected since resorcinol bisglycidyl ether contains 13.3% oxirane oxygen while the 1-(2,3-epoxypropoxy)-4-methoxybenzene contained only 7.2%. This latter compound is theefore an improvement since it is much more compatible and soluble in cellulose acetate butyrate formulations than resorcinol bisglycidyl ether or hydroquinone bisglycidyl ether.

It will be readily observed that the introduction of the p-methoxy group into phenylglycidyl ether results in a compound which gives much better heat stabilization. The 1-(2,3-epoxypropoxy)-4-methoxybenzene is also a better heat stabilizer than either resorcinol bisglycidyl ether or hydroquinone bisglycidyl ether, both of which contain more than twice the epoxy content.

*Example 8.—Heat stabilization of cellulose acetate*

Another series of tests were carried out using 100 parts of cellulose acetate (30-second, 39.4%), 50 parts of tripropionin, and 2 parts of stabilizer. The results listed in Table III are expressed as the percent decrease in intrinsic viscosity after application of heat at 205° C. for one hour.

TABLE III

| Stabilizer | Original ($\eta$) | Final ($\eta$) | Percent Breakdown |
| --- | --- | --- | --- |
| None | 1.34 | 1.13 | 16 |
| 1-(2,3-epoxypropoxy)-4-methoxybenzene | 1.37 | 1.26 | 8.0 |
| 1-(2,3-epoxypropoxy)-4-benzyloxybenzene | 1.27 | 1.16 | 8.7 |
| 1-(2,3-epoxypropoxy)-2-methoxybenzene | 1.29 | 1.20 | 7.0 |
| 1-(2,3-epoxypropoxy)-3-methoxybenzene | 1.29 | 0.98 | 24.0 |

TABLE I
[Screening tests using salt-free ester]

| Parts Stabilizer | Stabilizer | Parts KHOX | Original Flow, °F. | Original Color | Original Haze | 1-Hour Heat Test Flow, °F. | 1-Hour Heat Test Color | 2-Hour Heat Test Flow, °F. | 2-Hour Heat Test Color |
| --- | --- | --- | --- | --- | --- | --- | --- | --- | --- |
| | | .007 | 317 | 70 | 15 | 300 | 55 | 298 | 65 |
| | | .015 | 316 | 70 | 25 | 306 | 45 | 306 | 55 |
| | | .025 | 316 | 70 | 35 | 312 | 30 | 316 | 65 |
| | | .035 | 320 | 80 | 45 | 317 | 25 | 317 | 45 |
| 0.2 | MPGE | .005 | 308 | 55 | 12 | 311 | 40 | 310 | 60 |
| 0.2 | MPGE | .010 | 314 | 60 | 20 | 314 | 35 | 313 | 50 |
| 0.2 | MPGE | .018 | 315 | 70 | 25 | 317 | 35 | 316 | 45 |
| 0.2 | MPGE | .026 | 315 | 80 | 40 | 317 | 45 | 316 | 65 |
| 0.2 | RBGE | .005 | 319 | 70 | 12 | 316 | 25 | 315 | 55 |
| 0.2 | RBGE | .010 | 321 | 65 | 20 | 314 | 35 | 311 | 45 |
| 0.2 | RBGE | .018 | 324 | 65 | 30 | 318 | 35 | 311 | 45 |
| 0.2 | RBGE | .026 | 324 | 65 | 35 | 319 | 35 | 317 | 50 |
| 0.2 / 0.2 | RBGE / PTBP | .005 | 321 | 60 | 15 | 317 | 35 | 315 | 45 |
| 0.2 / 0.2 | RBGE / PTBP | .010 | 321 | 55 | 25 | 316 | 45 | 317 | 65 |
| 0.2 / 0.2 | RBGE / PTBP | .018 | 322 | 70 | 30 | 318 | 35 | 318 | 45 |
| 0.2 / 0.2 | RBGE / PTBP | .026 | 322 | 70 | 30 | 318 | 35 | 318 | 50 |
| 0.2 / 0.2 | PTBP / PTBP | .005 | 315 | 80 | 15 | 314 | 35 | 314 | 45 |
| 0.2 / 0.2 | MPGE / PTBP | .010 | 315 | 80 | 20 | 313 | 25 | 311 | 35 |
| 0.2 / 0.2 | MPGE / PTBP | .018 | 315 | 80 | 30 | 314 | 35 | 311 | 45 |
| 0.2 / 0.2 | MPGE / PTBP | .026 | 313 | 85 | 35 | 315 | 45 | 318 | 65 |

RBGE is resorcinol bisglycidyl ether; PTBP is p-tert-butylphenol; MPGE is 1-(2,3-epoxypropoxy)-4-methoxybenzene; KHOX is potassium acid oxalate.

*Example 7.—Heat stabilization of cellulose acetate*

Table II gives results of heat stability tests at 190° C. for ⅚ hour using 1% of various stabilizers in a formulation containing 7.5 g. of cellulose acetate (80-second, 39.4% acetyl) and 10 cc. of tripropionin.

TABLE II

| Stabilizer | Percent Epoxy | Percent Loss in Viscosity Melt | Percent Loss in Viscosity Intrinsic |
| --- | --- | --- | --- |
| None | | 85 | 40 |
| Phenylglycidyl ether | 8.2 | 25 | 21 |
| Resorcinol bisglycidyl ether | 13.3 | 7 | 13 |
| Hydroquinone bisglycidyl ether | 13.2 | 0 | 19 |
| 1-(2,3-epoxypropoxy)-4-methoxybenzene | 6.1 | 0 | 5 |

It will be observed in this series of tests that there is a distinct difference in function between the ortho and para alkoxy derivatives and the meta alkoxy derivatives.

I claim:

1. A composition of matter comprising a cellulose ester plastic molding composition selected from the group consisting of cellulose acetate and cellulose acetate butyrate and a small stabilizing amount of an alkoxyphenylglycide ether selected from the group consisting of o- and p-alkoxyphenylglycide ethers in which the alkyl radical of the alkoxy group is an unsubstituted acyclic alkyl radical of 1 to 4 carbon atoms inclusive.

2. A composition of matter comprising cellulose acetate and a small stabilizing amount of an alkoxyphenylglycide ether selected from the group consisting of o- and p-alkoxyphenylglycide ethers in which the alkyl radical of the alkoxy group is an unsubstituted acyclic alkyl radical of 1 to 4 carbon atoms inclusive.

3. A composition of matter comprising cellulose acetate butyrate and a small stabilizing amount of an alkoxyphenylglycide ether selected from the group consisting of o- and p-alkoxyphenylglycide ethers in which the alkyl radical of the alkoxy group is an unsubstituted acyclic alkyl radical of 1 to 4 carbon atoms inclusive.

4. A composition of matter comprising cellulose acetate butyrate and 1-(2,3-epoxypropoxy)-4-methoxybenzene.

5. A composition of matter comprising cellulose acetate butyrate and 1-(2,3-epoxypropoxy)-4-butoxybenzene.

6. A composition of matter comprising cellulose acetate butyrate and 1-benzyloxy-4-(2,3-epoxypropoxy)benzene.

7. A composition of matter comprising cellulose acetate and as a heat stabilizer therefor 0.2 parts by weight of 1-(2,3-epoxypropoxy)-4-methoxybenzene, as an additional stabilizer approximately 0.2 parts by weight of p-tertiary butylphenol, as a plasticizer approximately 4 parts by weight of dibutyl sebacate and as a flow stabilizer less than .03 parts by weight of potassium acid oxalate.

8. A thermoplastic composition selected from the group consisting of cellulose acetate and cellulose acetate butyrate stabilized against color development and degradation of melt-viscosity at molding temperatures by the presence of about 0.5 to about 4.0 parts by weight of the thermoplastic composition of an alkoxyphenylglycidyl ether selected from the group consisting of o-and p-alkoxyphenylglycidyl ethers in which the alkyl radical of the alkoxy group is an unsubstituted acyclic alkyl radical of 1 to 4 carbon atoms inclusive said ether being intimately dispersed in the thermoplastic composition.

References Cited in the file of this patent

UNITED STATES PATENTS 2,160,948     Wiley et al. _____ June 6, 1939

OTHER REFERENCES

Beilstein's Handbuch Der Organischen Chemie Erstes Erganzungswerk, 1934, vol. 17, page 51. (Copy in Sci. Lib.)